United States Patent [19]

Ghidorzi et al.

[11] Patent Number: 5,176,236
[45] Date of Patent: Jan. 5, 1993

[54] FACING MATERIAL FOR WET CLUTCH PLATE AND METHODS FOR FABRICATING AND APPLYING SAME

[75] Inventors: Anthony J. Ghidorzi, Bartlett; Robert J. Fanella, Wheaton; Robert W. Hornick, Downers Grove; Craig S. Larson, Schaumburg, all of Ill.

[73] Assignee: Borg-Warner Automotive Transmission & Engine Components Corporation, Sterling Heights, Mich.

[21] Appl. No.: 819,307

[22] Filed: Jan. 9, 1992

[51] Int. Cl.$^5$ .................. F16D 13/64; F16D 13/74
[52] U.S. Cl. .................. 192/107 R; 192/107 M; 192/113 B; 192/70.12; 188/218 XL
[58] Field of Search .......... 192/107 R, 107 M, 113 B, 192/70.12, 70.14; 188/218 XL, 264 B, 264 D, 264 E

[56] References Cited

U.S. PATENT DOCUMENTS

| | | | |
|---|---|---|---|
| 2,180,086 | 11/1939 | Kraft | 192/107 R |
| 3,476,228 | 11/1969 | Pritchard | 192/70.14 X |
| 3,480,117 | 11/1969 | Agren et al. | 192/107 R X |
| 3,999,634 | 12/1976 | Howell | 188/264 E X |
| 4,022,298 | 5/1977 | Malinowski | 188/264 E X |
| 4,027,758 | 6/1977 | Gustavsson et al. | 192/113 B |
| 4,260,047 | 4/1981 | Nels | 192/107 R X |
| 4,280,609 | 7/1981 | Cruise | 192/113 B |
| 4,358,001 | 11/1982 | Iverson | 188/264 E X |
| 4,678,070 | 7/1987 | Light | 192/70.12 X |
| 4,726,455 | 2/1988 | East | 192/107 R |
| 4,913,267 | 4/1990 | Campbell et al. | 188/218 XL |
| 4,967,893 | 11/1990 | Vogele | 192/107 R |
| 4,995,500 | 2/1991 | Payvar | 192/107 R |
| 5,056,631 | 10/1991 | Macdonald | 192/107 R X |
| 5,083,650 | 1/1992 | Seiz et al. | 192/107 M |
| 5,094,331 | 3/1992 | Fujimoto et al. | 192/70.12 |
| 5,101,953 | 4/1992 | Payvar | 192/107 R |

Primary Examiner—Leslie A. Braun
Assistant Examiner—Andrea Pitts
Attorney, Agent, or Firm—Willian Brinks Olds et al.

[57] ABSTRACT

A groove pattern for the paper-based annular friction facing (38) on an annular plate (39) of a clutch plate (41) of a wet clutch to equalize the surface temperature of the friction facing and thus increase the thermal capacity of the clutch where there is continuous slippage. The groove pattern includes one or more continuous annular grooves (42,43,44,45) dividing the friction area into at least three annular bands (46,47,48,49,50), an inner band (46), at least one intermediate band (47,48,49), and an outer band (50), and a plurality of cross grooves (51,52) in each band which are angled with respect to a radius of the facing. The angled cross grooves extend at an acute angle (a,b) (10-60 degrees) to such radius. Slip of the friction pair of plates causes a viscous pumping action. The cross groove angle in each band of the facing is similar so as to keep all the grooves filled with cooling oil, and the cross-section of the cross grooves vary in their dimensions as between the bands. The angled cross grooves of this pattern also provides viscous pumping of oil through the facing. The annular bands are formed by molding before the facing is bonded to the annular plate, but the cross grooves are preferably formed continuously through the facing in a blanking operation before the facing is applied to the annular plate. When the cross grooves are formed by blanking, the facing is preferably formed with a radially thin runner strip on its outermost periphery to rigidify the facing for ease of handling before it is applied to the annular plate. The runner strip is removed after the facing is applied to the annular plate.

13 Claims, 2 Drawing Sheets

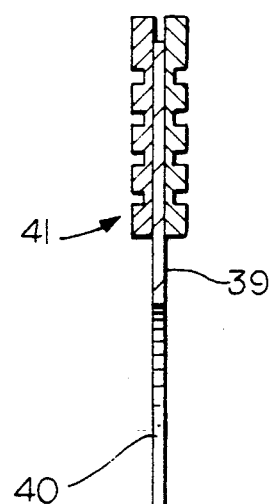
FIG. 2
FIG. 3
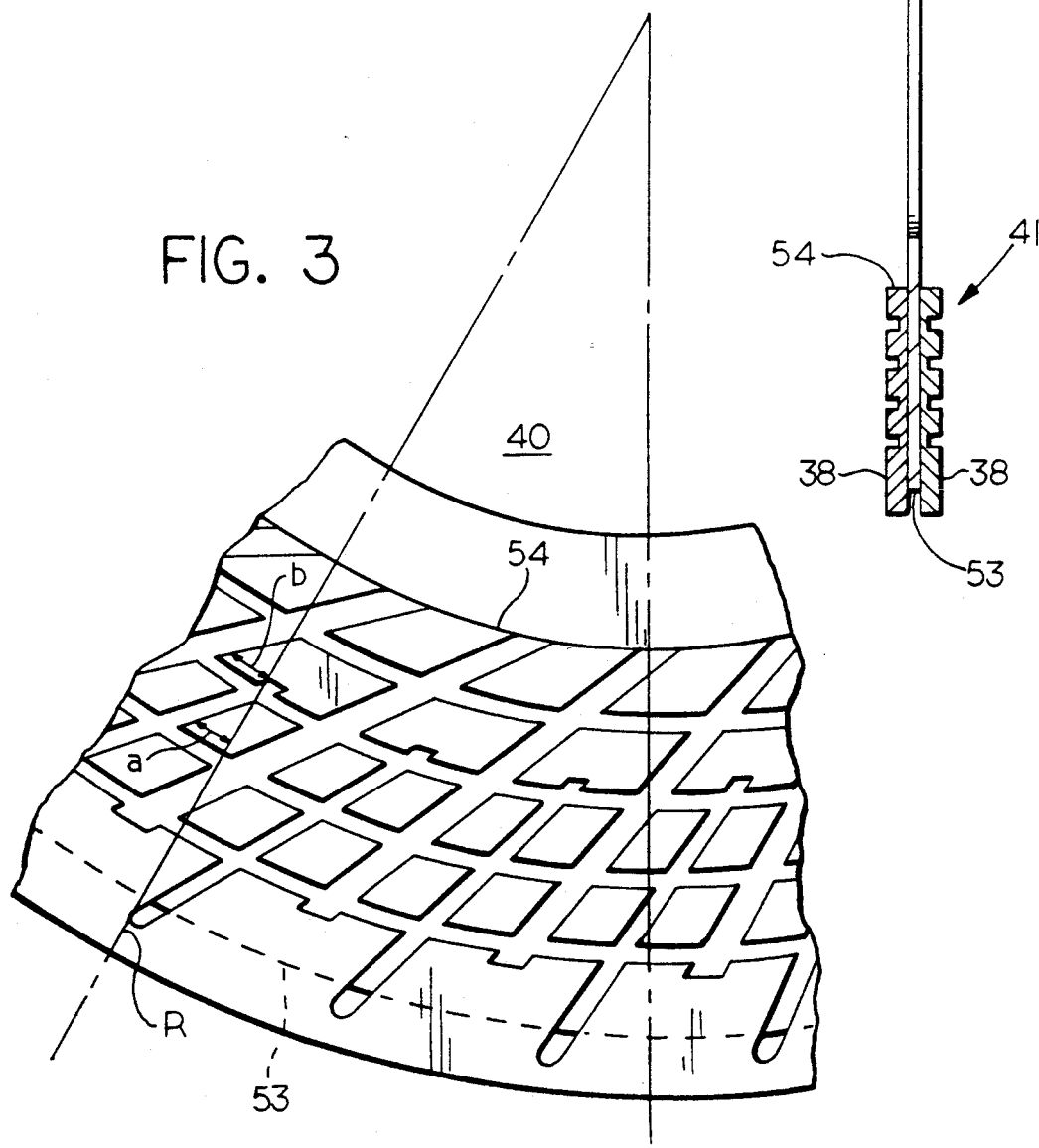

FACING MATERIAL FOR WET CLUTCH PLATE AND METHODS FOR FABRICATING AND APPLYING SAME

TECHNICAL FIELD

This invention relates to a grooved facing material for the clutch plate of a wet clutch assembly and to methods for fabricating such a facing material and for applying the facing material to a clutch plate.

BACKGROUND OF THE INVENTION

As is disclosed in U.S. Pat. 4,995,500 (Payvar), the clutch plate for a typical wet clutch assembly is made up of an annular plate, usually of a metallic material, with an annular friction facing, usually of a resin-impregnated grade of paper, bonded to each of the opposed faces of the annular plate. The facing material has grooves or other recesses in its outwardly facing surface, and these grooves or recesses define oil flow passages extending from an inside diameter to an outside diameter of the facing. The oil flow passages permit oil within the clutch assembly to flow in contact with the facing of the clutch when the facing is in clutching engagement with the face of an adjacent separator plate, and serve to dissipate heat which will result from such clutching engagement. Typically, the grooves in a grooved clutch plate are machined in the facing material after the facing material is bonded to the annular clutch plate. This is a rather time consuming and expensive manufacturing technique, and the necessary machining tolerances which are applicable to the machining of the grooves limit the depth of each of the grooves to something less than the thickness of the face of the material, to avoid damage to the underlying clutch plate. The limited groove depth, in turn, limits the rate of oil flow through the grooves, for a given groove surface area, and, thus, limits the cooling capacity of the clutch plate. Alternatively, a clutch plate facing can be formed with grooves therein by a molding operation. However, this also limits the depth of each of the grooves to something less than the thickness of the facing material.

SUMMARY OF THE INVENTION

According to the present invention, a facing material for a wet clutch plate, for example, a clutch plate for a start clutch used in connecting an automotive engine to a transmission of the continuously variable type, an application in which a clutch plate is subject to slippage over an extended period of time, has full thickness, generally radially extending grooves formed therein during a blanking operation, before the facing material is bonded to an underlying clutch plate. A radially thin annular runner portion is provided in the outermost periphery of the facing during the blanking operation to add rigidity to the facing for ease of handling before it is bonded to an underlying clutch plate. This runner portion, which extends beyond the free edge of the underlying clutch plate, is then sheared off after the facing material is bonded to the clutch plate. By blanking the generally radially extending grooves, each groove will extend entirely through the thickness of the facing material to the underlying clutch plate, and this will increase oil flow rates through the grooves for a given groove surface area and pattern, and thereby increase the cooling of the clutch plate during its engagement with the separator plate. Further, in a preferred embodiment of the present invention, each of the grooves is inclined at an oblique angle, in the normal direction of rotation of the clutch plate assembly, to a radius of the clutch plate assembly. This orientation of the grooves will further increase the flow of oil therethrough by utilizing the tangential forces on the oil which will result from the rotation of the clutch plate assembly. Thus, the use of inclined grooves also increases the oil flow through each groove in relation to oil flow through a radially extending groove of similar width and depth.

Accordingly, it is an object of the present invention to provide an improved clutch plate for a wet clutch assembly. More particularly, it is an object of the present invention to provide a clutch plate of the foregoing character with a grooved facing of improved cooling oil flow capacity on each of its opposed surfaces It is also an object of the present invention to provide improved methods for forming grooves in a facing for a clutch plate of the foregoing character and for forming a clutch plate of such character with a facing on each of its opposed surfaces.

For further understanding of the present invention and the objects thereof, attention is directed to the drawing and the following brief description thereof, to the detailed description of the preferred embodiment, and to the appended claims.

BRIEF DESCRIPTION OF THE DRAWING

FIG. 2 is a sectional view taken of line 2—2 of FIG. 1; and

FIG. 3 is a fragmentary plan view at an enlarged scale of a portion of the clutch plate of FIG. 1 illustrating the angles of the cross grooves with respect to a radius of the facing.

DETAILED DESCRIPTION OF THE PREFERRED EMBODIMENT

Figure 1:
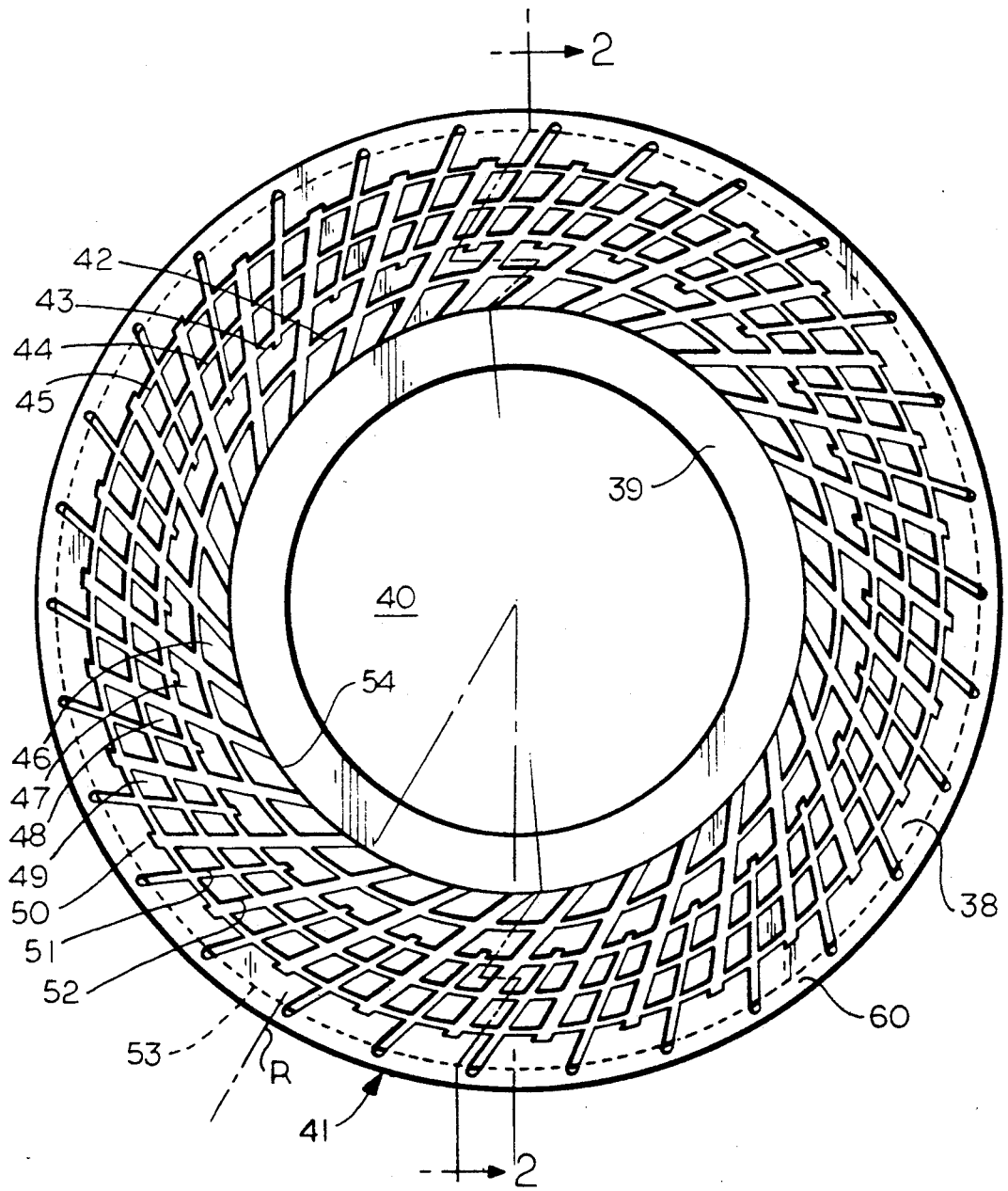
FIG. 1 is a plan view of a clutch plate according to the preferred embodiment of the present invention.

A clutch plate according to the present invention is illustrated generally by reference numeral 41 and is made up of a metal plate 39 Which has an opening or annulus 40 therein and an annular facing 38 bonded to each of the opposed faces of the metal plate 39. Each annular facing 38 is preferably formed from a resin-impregnated grade of paper. The rotation of the clutch plate 41 of a wet clutch (otherwise not shown) of the present invention relative to the metal mating face of a mating plate of the clutch produces movement of cooling oil radially from an inner diameter of the clutch plate 41 to the outer diameter thereof. Each of the annular friction facings 38 of the clutch plate 41 has an annular inner edge 54 and an annular outer edge 53 and includes spaced apart, concentric annular grooves 42-45 between and concentric to the edges 54, 53. The annular grooves 42-45 separate the facing 38 into five adjacent annular bands 46-50. In each of the bands 46-50 are a plurality of circumferentially substantially equally spaced interleaved sets of cross grooves 51 and 52 formed in each of the facings 38, preferably by blanking, a forming technique which will ensure that the depth of each of the cross grooves 51, 52 is equal to the thickness of the facing 38. Each of the cross grooves 51 and 52 extends in a direction at angles "a" and "b", respectively, to a radius R of the annular plate 39, as illustrated in FIG. 3. Each of the angles "a" and "b" between the center line of the cross groove extending across the bands 46-50 and the radius R is in the range of 10-60 degrees. As is shown on FIG. 1, there are two types of angled cross grooves 51 and 52: one type 51 extending linearly from the outer diameter 53 into the second annular band 47; the other type 52 extending linearly from the inner diameter 54 into the outermost annular band 50. The angled cross grooves 51 and 52 extending through or into the annular bands 46-50 are equally spaced at an angle of approximately 6° to each other.

Oil is pumped through the grooves 51, 52, 42-45 of the clutch plate 41 of a standard wet clutch (not shown) by centrifugal force, and when the clutch plate 41 is stationary, or even when it is operating at a relatively low speed (e.g. under 1000 RPM), there will be an inadequate flow of oil through the grooves for proper cooling. In the absence of oil flow through the grooves, the clutch face temperature will rise and this can lead to hot spots or thermal failure of the clutch facing. Excess temperature will also tend to cause decomposition of the cooling oil. In the present invention these effects are avoided principally by the relative slip of the mating friction pair which will cause a viscous pumping action induced by the velocity of the components running parallel to the groove axis.

The distribution and design of angled cross grooves 51 and 52 and annular bands 46-50 bring about a substantially uniform temperature of the interface of the wet clutch and provides the clutch with high thermal capacity. Because the grooves 51 and 52 are at angles "a" and "b", respectively, to the radial direction, the relative slip of the mating steel plate causes viscous pumping of the oil through the various grooves. This is important for thermal performance of the groove system.

The grooves 51 and 52 across the annular bands 46-50 may vary in one or both of their cross-sectional dimensions to achieve hydraulic balancing and heat transfer area balancing depending upon the design parameters for the clutch.

The angled cross grooves 51 and 52 of the preferred embodiment are each of rectangular cross section: one type 51 preferably being approximately 0.030-0.037 inches deep and approximately 0.045 inches wide; the other type 52 preferably being approximately 0.030-0.037 inches deep and approximately 0.090 inches wide. Placing a groove at an angle of 30° to radius R will pump approximately one gallon per minute at typical slip speeds between the matching plates of the wet clutch. Typical oil flow of other designs of wet clutch produce approximately 0.15 to 0.20 gallons per minute per clutch face. The present invention provides a marked improvement in cooling of the clutch and thereby improves the thermal capacity. This increases the overall capacity of the wet clutch. It also provides for some oil pumping even when the clutch is not under rotation, and this is especially important in preventing overheating in a CVT start clutch, a type of clutch which is used in relatively slow start applications.

Further, the depth of both annular grooves 42-45 and cross angle grooves 51 and 52 may be varied to provide improved recirculation of oil within the grooves. The groove depth may vary between the annular bands 46-50 to achieve balancing of the flow of oil and prevent emptying the grooves of the oil due to centrifugal forces upon rotation of the clutch plate 40. This generally requires the angled groove depth to decrease between the inner band 46 and the outer band 50.

The angled grooves 51 and 52 are shown in FIG. 1 in placement so as to aid oil flow from the inner edge 54 of each of the facings 38 to its outer edge 53 for a given direction of rotation of the clutch plate 41. To retard flow of the oil so as to decrease its flow rate through the grooves, or, in the alternative, to reverse the flow from outer edge 53 to inner edge 54 of the facing, the grooves in any or all of the annular bands 46-50 may be angled in an opposite direction with respect to the radius R and the direction of rotation. That is to say if the cross grooves 51 and 52 are placed as shown and the rotation of the clutch plate 41 is in a reverse direction, the pumping action will be reversed its direction.

The clutch plate illustrated in FIG. 2 has a facing 38 of a friction material on each of its opposed outer faces. In the alternative, the clutch plate may be provided with single facing 38 depending upon the nature of the clutch and service requirements. In either event, the main principles of this invention will apply.

In the manufacture of each of the facings 38, preferably the grooves 51 and 52 are formed therein before the facing 38 is bonded to the annular plate 39. This may be done readily in a blanking operation in which the material originally occupying the grooves 51 and 52 is cut away from the surrounding material of the facing by a mating punch and die, a technique which is known in the manufacture of other types of paper and paper-based products. As previously noted, when such a blanking operation is performed, the depth of each of the grooves 51 and 52 will be the full thickness of the material of the facing 38, in contrast to the formation of grooves in a facing material by machining, or by molding, which requires that the depth of each groove be somewhat less than the full thickness of the facing. The enhanced depth of the grooves 51 and 52, when formed by blanking, as described, and in relation to grooves formed by machining or molding, increases the flow rate of cooling oil through the grooves, for a given groove surface area and configuration.

When the grooves 51 and 52 are formed in a facing 38 by blanking, as described, it is useful to provide the original facing 38 with an annular, endless runner strip 60 beyond the finished outside diameter 53 thereof. The runner strip 60 is sheared away from the facing 38 after the facing 38 has been bonded to the annular plate 39, but serves to rigidify the facing 38 and thereby facilitate its handling until the completion of the bonding of the facing 38 to the plate 39. As illustrated in the drawing, the outermost extremity of each of the grooves 51 extends into the runner strip 60. In any case, it is desirable to form each of the annular grooves 42-45 in the facing 38 by molding before the facing 38 has been bonded to the plate 39, or by machining after the facing 38 has been bonded to the plate 39.

Groove shape, as well as groove pattern and manufacturing method, can affect shudder during engagement. A square corner groove is less prone to shudder than a rounded compacted edge. When the grooves 51 and 52 are formed by blanking, as described, it is possible to produce a square corner groove rather than a rounded compacted edge of a molded groove. Square corner grooves can also be produced by machining. However, a complex groove pattern such as the one herein described would typically be molded for volume production, not machined. This of course would cause the clutch plate 41 to be more prone to shudder than it is when manufactured according to the preferred embodiment of this invention.

Although the best mode contemplated by the inventors for carrying out the present invention as of the filing date hereof has been shown and described herein, it will be apparent to those skilled in the art that suitable modifications, variations, equivalents may be made without departing from the scope of the invention, such scope being limited solely by the terms of the following claims.

What is claimed is:

1. An annular facing for application to at least one surface of an annular rotatable clutch plate of a wet clutch, said facing comprised of a paper-based material extending at least partly between inner and outer diameters of the plate, an outer surface of said facing being grooved to receive coolant oil, said grooved facing surface being of a pattern comprising:

a plurality of annular grooves dividing said facing surface into at least three annular bands, an inner band, at least one intermediate band, and an outer band, a plurality of inner band and outer band cross grooves connecting said annular bands, said inner band cross grooves extending linearly from an annular inner edge of said facing to said outer band, said outer band cross grooves extending linearly from an annular outer edge of said facing to said intermediate band, said inner and outer band cross grooves extending at an angle to a radius of the plate and connecting an inner diameter of said facing with said plurality of annular grooves and an outer diameter of said facing, said plurality of inner and outer band cross grooves causing viscous pumping of oil across said facing during the rotation of the clutch plate.

2. The facing of claim 1 wherein each of said cross grooves of said facing is disposed at an angle to a radius of said facing that is an acute angle.

3. The facing of claim 2 wherein said angle between said each of said cross grooves and said radius is in the range of 10–60 degrees.

4. The facing of claim 2 wherein said inner band cross grooves and said outer band cross grooves are interleaved with one another.

5. The facing of claim 1 wherein the cross-sectional size of each of said inner band cross grooves is greater than the cross-sectional size of each of said outer band cross grooves.

6. The facing of claim 4 wherein said inner band cross grooves are circumferentially spaced substantially equally and wherein said outer band cross grooves are circumferentially spaced substantially equally.

7. A rotatable clutch plate for a wet clutch comprising:

an annular metal plate;

a paper-based annular facing on said metal plate, said facing extending from an outer diameter of said plate toward an inner diameter of said plate, said facing including;

a plurality of annular grooves dividing said facing into at least three annular bands, an inner band, at a plurality of circumferentially spaced apart inner band and outer band cross grooves of which extending at an angle to a radius of the plate, said inner band cross grooves extending linearly from an annular inner edge of said facing to said outer band, and said outer band cross grooves extending linearly from an annular outer edge of said facing to at least one of said intermediate band, said cross grooves causing viscous pumping of oil across said facing during the rotation of said clutch plate.

8. The clutch plate of claim 7 wherein each of said angular cross grooves extends at an angle to a radius of said plate that is an acute angle.

9. The clutch plate of claim 8 wherein the inner band cross grooves and the outer band cross grooves are interleaved with one another.

10. The clutch plate of claim 9 wherein the cross-sectional size of each of said inner band cross grooves is greater than the cross-sectional size of each of said outer band cross grooves.

11. The clutch plate of claim 10 wherein said inner band cross grooves are circumferentially spaced substantially equally and wherein said outer band cross grooves are circumferentially spaced substantially equally.

12. A wet clutch assembly comprises a friction facing and an annular plate, said friction facing bonded to said annular plate and having an inner diameter, an outer diameter, an annular runner strip, and surface grooves to receive cooling oil, said surface grooves having a pattern including a plurality of annular grooves dividing said facing surface into at least three annular bands, an inner band, at least one intermediate band, and an outer band, a plurality of inner band and outer band cross grooves connecting sand annular bands, said inner band cross grooves extending linearly from an annular inner edge of said friction facing to said annular outer band, and said outer band cross grooves extending linearly substantially to, but not through, said runner strip rom said intermediate annular band, said inner and outer band cross grooves extending at an angle to a radius of the plate and connecting an inner diameter of said facing, said plurality of annular grooves and an outer diameter of said friction facing, said plurality of inner and outer band cross grooves causing viscous pumping of oil across said friction facing during the rotation of the clutch plate.

13. The friction facing of claim 12 wherein the depth of said inner and outer band cross grooves is equal to the thickness of the friction facing.

* * * * *

UNITED STATES PATENT AND TRADEMARK OFFICE
CERTIFICATE OF CORRECTION

PATENT NO.  : 5,176,236
DATED       : January 5, 1993
INVENTOR(S) : Anthony J. Ghidorzi et al.

It is certified that error appears in the above-identified patent and that said Letters Patent is hereby corrected as shown below:

Claim 7, column 6, line 3, after "at" insert --least one intermediate band, and an outer band,--, column 6, line 5, delete "of which", Claim 12, column 6, line 30, "comprises" should be --comprising--, column 6, line 43, "sand" should be --said-- and column 6, line 48, "rom" should be --from--.

Signed and Sealed this

Twenty-eighth Day of December, 1993

Attest:

BRUCE LEHMAN

*Attesting Officer*      *Commissioner of Patents and Trademarks*